(12) United States Patent
Groves et al.

(10) Patent No.: US 10,932,402 B2
(45) Date of Patent: Mar. 2, 2021

(54) WEAR RESISTANT DISK BLADE AND AGRICULTURAL MACHINE WITH WEAR RESISTANT DISK BLADE

(71) Applicant: Deere & Company, Moline, IL (US)

(72) Inventors: Tyler G. Groves, Bettendorf, IA (US); Robert W. Martin, Davenport, IA (US); Brent A. Augustine, Davenport, IA (US); Peter R. Nedved, Coal Valley, IL (US)

(73) Assignee: DEERE & COMPANY, Moline, IL (US)

(*) Notice: Subject to any disclaimer, the term of this patent is extended or adjusted under 35 U.S.C. 154(b) by 301 days.

(21) Appl. No.: 15/615,404

(22) Filed: Jun. 6, 2017

(65) Prior Publication Data

US 2018/0098479 A1    Apr. 12, 2018

Related U.S. Application Data

(60) Provisional application No. 62/406,452, filed on Oct. 11, 2016.

(51) Int. Cl.
| | | |
|---|---|---|
| A01B 23/06 | (2006.01) | |
| A01C 5/06 | (2006.01) | |
| A01B 15/16 | (2006.01) | |
| A01B 33/02 | (2006.01) | |
| B22F 1/02 | (2006.01) | |
| B23K 26/34 | (2014.01) | |

(52) U.S. Cl.
CPC ............ A01B 33/024 (2013.01); A01B 23/06 (2013.01); B22F 1/02 (2013.01); B23K 26/34 (2013.01)

(58) Field of Classification Search
CPC .................. B28D 1/121; B24D 5/123
See application file for complete search history.

(56) References Cited

U.S. PATENT DOCUMENTS

| | | | | |
|---|---|---|---|---|
| 1,709,606 | A * | 4/1929 | Catland ............... | B23K 31/025 76/108.1 |
| 2,808,044 | A * | 10/1957 | Upper .................. | B23D 61/021 125/15 |
| 3,048,160 | A * | 8/1962 | Griffin ................. | B23D 61/026 125/15 |
| 4,854,295 | A * | 8/1989 | Sakarcan ............. | B23D 61/021 125/15 |
| 5,297,637 | A * | 3/1994 | Rowlett ................ | A01B 15/18 172/555 |
| 6,857,255 | B1 * | 2/2005 | Wilkey et al. ........ | A01D 34/13 56/296 |
| 6,890,250 | B1 * | 5/2005 | Kim ....................... | B24D 5/00 451/541 |
| D513,952 | S * | 1/2006 | Lee ................................ | D8/70 |
| D587,979 | S * | 3/2009 | Jeiziner ........................... | D8/70 |
| 8,568,206 | B2 * | 10/2013 | Ramanath ............... | B24D 7/06 125/15 |
| 9,227,342 | B2 * | 1/2016 | Hoang ................... | B23D 61/04 |
| 9,427,846 | B2 * | 8/2016 | Aoki .................... | B23D 61/021 |

(Continued)

*Primary Examiner* — Tara Mayo-Pinnock

(57) ABSTRACT

A disk blade having a circular blade body of a first base material of a first hardness and having top and a bottom surfaces and an outer edge extending around the blade body. At least one clad bead extends circumferentially about the blade body on the bottom surface adjacent the outer edge of a second hardness greater than the first hardness of the base material. Various bead patterns are possible.

15 Claims, 12 Drawing Sheets

(56) References Cited

U.S. PATENT DOCUMENTS

| | | | | |
|---|---|---|---|---|
| 9,700,993 B2* | 7/2017 | Gosamo | ............ | B24D 7/066 |
| 2002/0178890 A1* | 12/2002 | Okuda | ............ | B23D 61/028 |
| | | | | 83/835 |
| 2003/0029296 A1* | 2/2003 | Donazzan | ............ | B23D 47/005 |
| | | | | 83/835 |
| 2010/0199964 A1* | 8/2010 | Baron | ............ | B23D 61/021 |
| | | | | 125/15 |
| 2014/0010998 A1* | 1/2014 | Hoang | ............ | B24D 5/123 |
| | | | | 428/172 |
| 2014/0373693 A1* | 12/2014 | Gosamo | ............ | B28D 1/121 |
| | | | | 83/39 |

* cited by examiner

WEAR RESISTANT DISK BLADE AND AGRICULTURAL MACHINE WITH WEAR RESISTANT DISK BLADE

FIELD

This disclosure pertains to agricultural machines such as seeding or planting machines or tillage machines and in particular to wear resistant disk blades for such machines.

BACKGROUND

Disk blades are used in agricultural machines in a variety of ways, including tillage of soil as well as to open a furrow in the soil to apply seed, fertilizer or other commodities. Due to the harsh conditions in which the blades-operate, they are subject to wear and require regular replacement. A need exists for increasing the service life of the disk blades.

SUMMARY

In one aspect, the disclosure provides an agricultural machine that includes a frame and at least one disk blade carried by the frame. The disk blade has a circular blade body of a first base material having a first hardness. The blade body has top and bottom surfaces and an outer edge extending around the blade body. At least one bead of cladding extends circumferentially around the blade body on the bottom surface adjacent the outer edge. This cladding is of a second hardness greater than the first hardness of the base material.

In another aspect, the disclosure provides a disk blade for an agricultural machine having a circular blade body of a first base material with a first hardness. The blade body has top and bottom surfaces and an outer edge extending around the blade body. At least one bead of cladding extends circumferentially around the blade body on the bottom surface adjacent the outer edge. This cladding is of a second hardness greater than the first hardness of the base material.

In yet another aspect, the disclosure provides a disk blade for an agricultural machine having a circular blade body of a first base material having a first hardness. The blade body has top and a bottom surfaces and an outer edge extending around the blade body. A plurality of clad beads extend radially inwardly from the outer edge, having a second harness greater than the first hardness The beads are curved so as to be more tangential to the outer edge at outer ends of the beads and curved radially inwardly to a more radial direction at inner ends of the beads.

In yet another aspect, the disclosure provides a disk blade for an agricultural machine having a circular blade body of a first base material having a first hardness. The blade body has top and a bottom surfaces and an outer edge extending around the blade body. A portion of the bottom surface of the blade body is recessed. The recess is filled with a clad bead having a second hardness that is greater than the first hardness. The clad bead has a surface that is generally flush with the bottom surface of the blade body.

DETAILED DESCRIPTION

Figure 1:
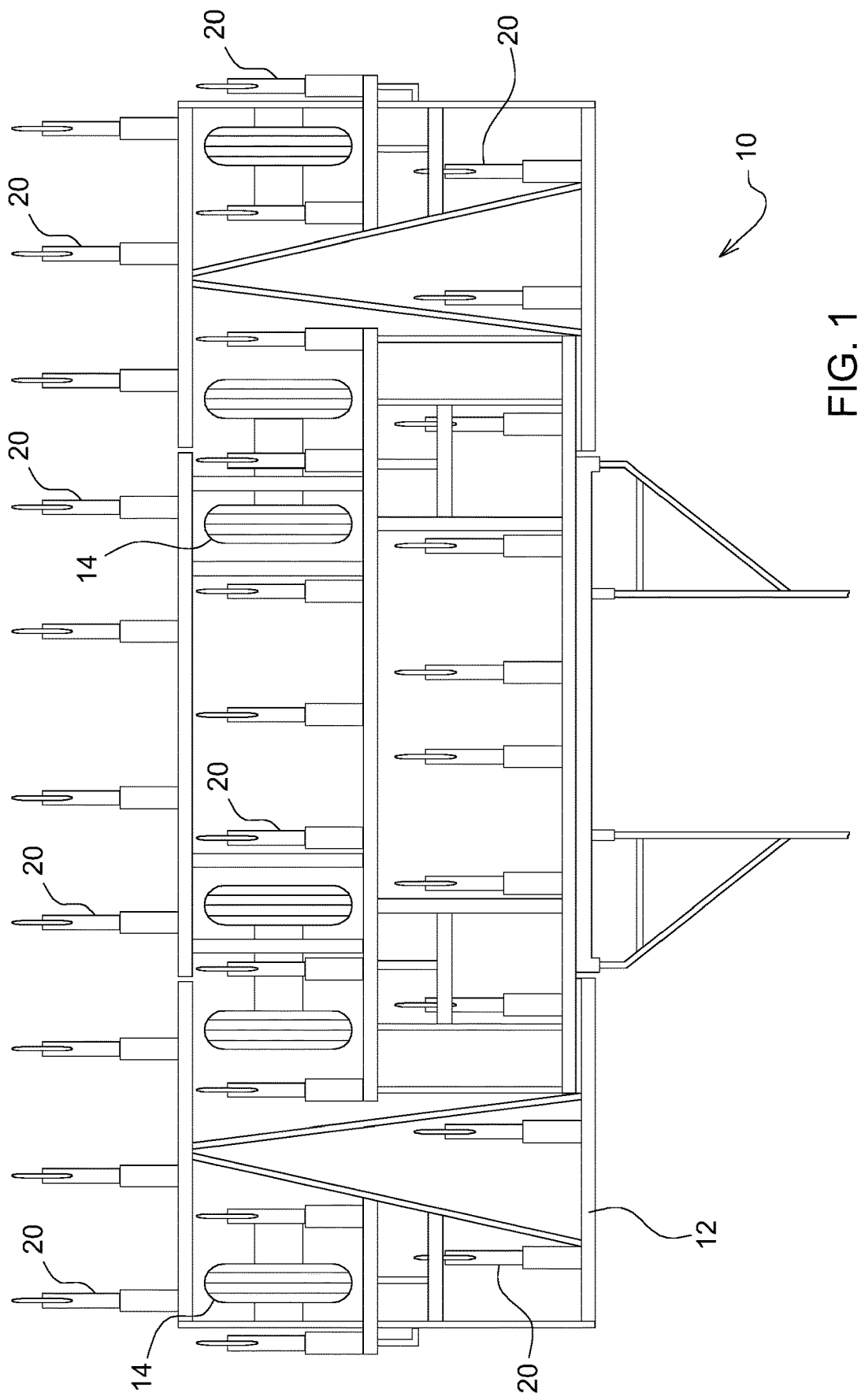
FIG. 1 is a plan view of a seeding tool for depositing seed and fertilizer into furrows in the soil as the machine is moved across a soil surface.

With reference to FIG. 1, an exemplary air seeding tool 10 is shown. Tool 10 includes a frame 16 supported on wheels 14 and equipped with a tongue 12 for coupling to a towing vehicle, such as an agricultural tractor, not shown. The tool 10 is has a plurality of opener assemblies 20 for opening a furrow in the soil to deposit seeds therein. Seed or commodity stored in tank 18 is delivered to the openers from a metering assembly (not shown) by a pneumatic distribution system (not shown) in a well-known manner.

Figure 2:
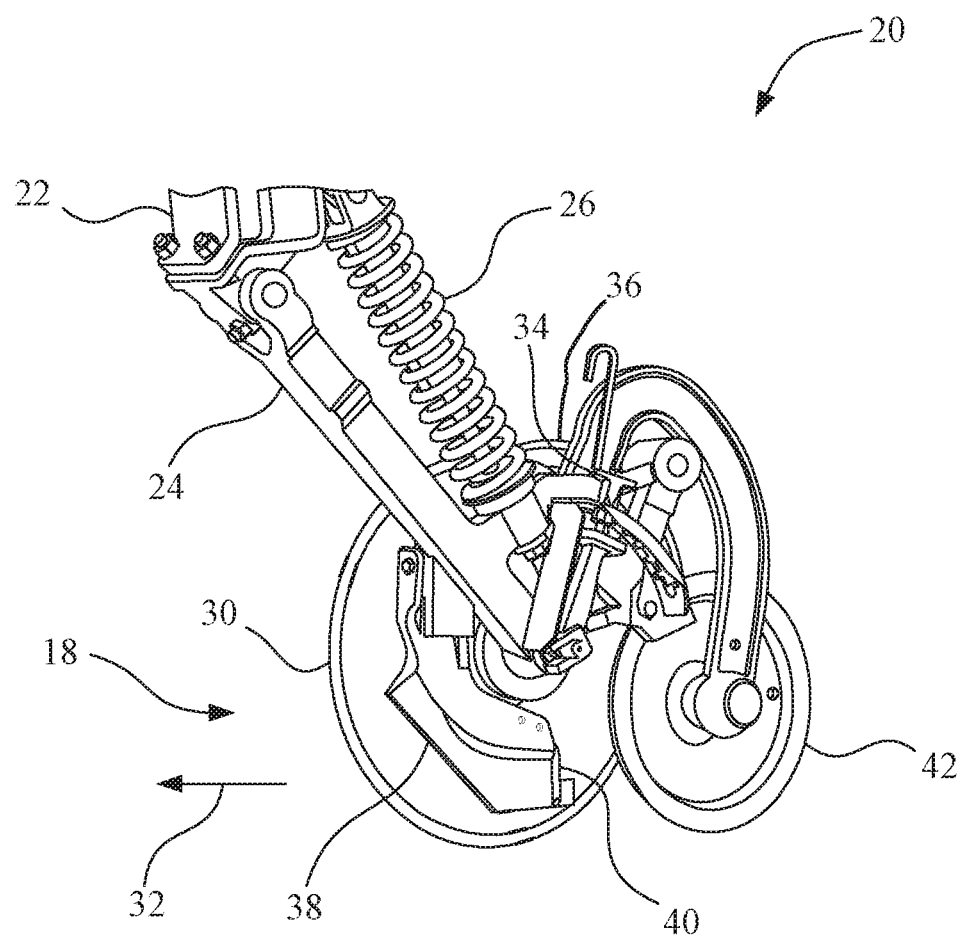
FIG. 2 is a perspective view of a single disk opener assembly of the tool shown in FIG. 1.

Single disk opener assembly 20 is shown in greater detail in FIG. 2. The opener assembly 20 is exemplary of a variety of different arrangements of single disk openers. Opener assembly 20 may be used for seed, fertilizer or for other chemicals. Opener assembly 20 has a frame 22 which includes a linkage 24 which is biased downward by a compression coil spring 26. A disk blade 30 is mounted to the linkage 24 for rotation as the machine moves through a field. The disk blade is slightly angled relative to the forward travel direction shown by the arrow 32 to form a shallow furrow in the soil. A quick depth adjuster 34 moves a gauge wheel 36 (on the back side of the disk 30) relative to the disk blade 30 to set the depth of penetration of the disk blade 30 into the soil and thus the depth of the furrow formed in the soil. The gauge wheel 36 is on the side of the disk blade body and may contact the blade body surface or be closely to the blade body surface to clear dirt and mud off the disk blade. A seed boot 38 includes a tube 40 for directing seed or fertilizer into the furrow. A closing wheel 42 is positioned behind and to the side of the boot 38 to close the furrow after seed or fertilizer has been deposited therein.

The opener disk blade 30 operates in soil which may be abrasive and may also contain rocks and other objects that damage (dull, wear out, ding, chip, bend) the blade edge. As a result, the disk blade is a component that is frequently replaced during the life of the tool 10. Blade replacement is not inexpensive as larger tools may have 75 to 100, or more disk blades. In addition to the cost of the blades, considerable time is required to remove and replace the blades. As a result, there is a desire to improve the wear resistance of the blades to increase their service life. Changing the material composition of the disk, and or heat treating different areas of the disk have been the extent to which historical improvements have been made. We have found that wear resistant coatings pose several challenges which have prevented them from being manufactured economically in the past. The challenges result from adding heat to the perimeter of the disk, causing it to warp, weak bonds between the coating and the base disk material, which result in chipping of the coating followed by uneven wear which effects seed placement, and the effects of the added thickness of the coating on the disks' ability to retain a thin profile which is required to penetrate into hard soils and to cut through crop residue.

The disk blade 30 has a generally circular blade body 50 made of a first base material having a first hardness. The base material may be a heat treated carbon-boron steel such as Deere Part number N283804, though other steel alloys may be used. All, or only the outer portion, of the disk blade body may be heat treated. The body 50 has a central aperture 52 and bolt holes 54 for mounting the blade to a bearing hub on the linkage 24. The blade body has a top surface 56 and bottom surface 58. In the example blade body 50 shown in FIG. 3, the blade thickness is approximately 5 mm, although the blade body can have other thicknesses. Near the outer edge 60, the top surface 56 is formed with a bevel 62, FIG. 4, so that the thickness of the blades at the outer edge 60 is reduced considerably from the thickness of the body 50. The thickness of the outer edge may be about 1 mm. The outer edge 60 functions as a cutting edge as the blade moves through the soil. The cutting edge cuts into the soil and is intended to cut through any plant residue remaining on or within the soil. If the cutting edge wears and becomes dulled, the blade may not cut through plant residue, but instead pushes the residue into the furrow, called "hairpinning," producing a less than optimum environment for seed germination and plant growth. For proper functioning, it is necessary to maintain the cutting edge.

The disk blade is mounted to the opener assembly 20 at a slight angel to the forward direction so as to form a generally V-shaped furrow in the soil. The top surface 56 with the bevel 62 is on the rearward facing side while the flat bottom surface 58 confronts the soil in the forward direction. As such, it is the bottom surface 58 that is subject to the most wear. Thus, cladding this surface reduces the wear and extends the disk blade life.

To reduce wear of the blade body 50, a bead of hardened material is applied to the bottom surface 58 near the outer edge 60. The hardened material has a second hardness that is greater than the first hardness of the base material of the blade body. The bead may be made of metallic alloy containing hard phase precipitates such as a metallic carbide or metallic boride. One suitable material is a metallic matrix carbide such as Rockit™ 701 from Hoganas AB of Sweden. Other metallic matrix carbides or borides may be used as well. The hardened material is metallurgically bonded to the base material. The bead may be applied by laser cladding, Plasma Transferred Arc (PTA) process, welding or other direct metal deposition methods.

In one example, the bead may be about 2 mm in width and 0.35-0.5 mm in thickness. Other thicknesses and widths may be used. The hardness of the hardened material, that is the second hardness, may be between 700-1300 HV (Vickers Hardness). The bead is a line of the hardened material which can be a single narrow pass around the blade body near the outer edge, multiple narrow passes, either adjacent and touching one another or spaced from one another, or a single or multiple wide passes.

Figure 5:
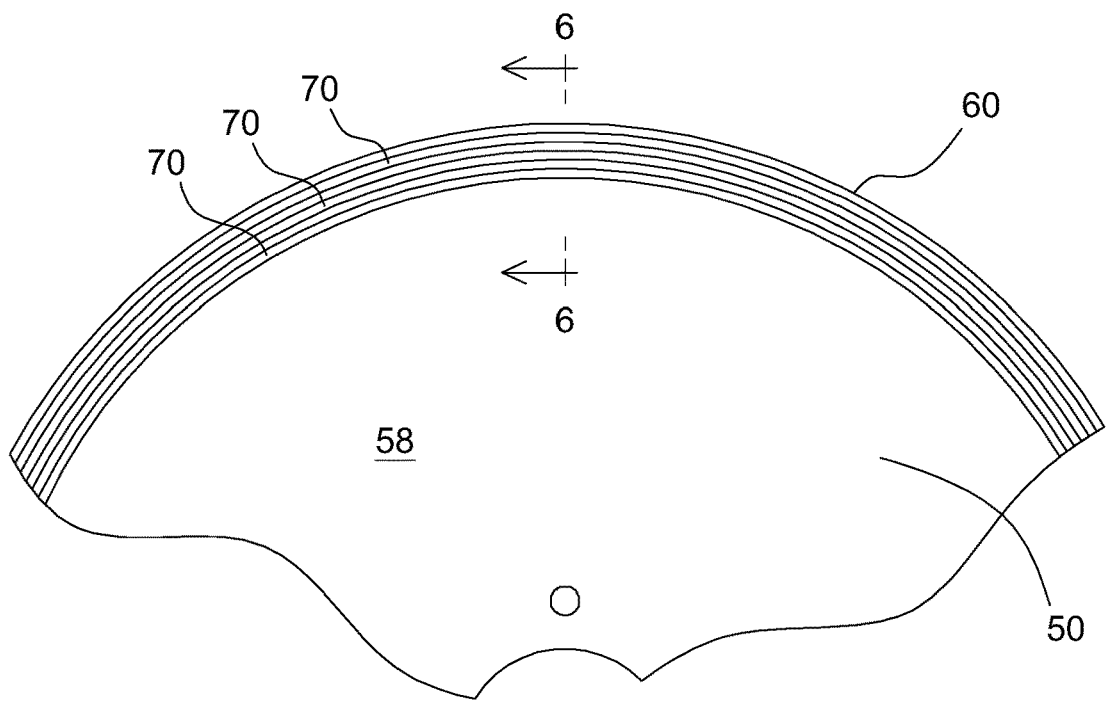
FIG. 5 is a fragmentary plan view of a bottom surface of the disk blade illustrating one embodiment of the hardened material beads on the disk blade.
Figure 6:
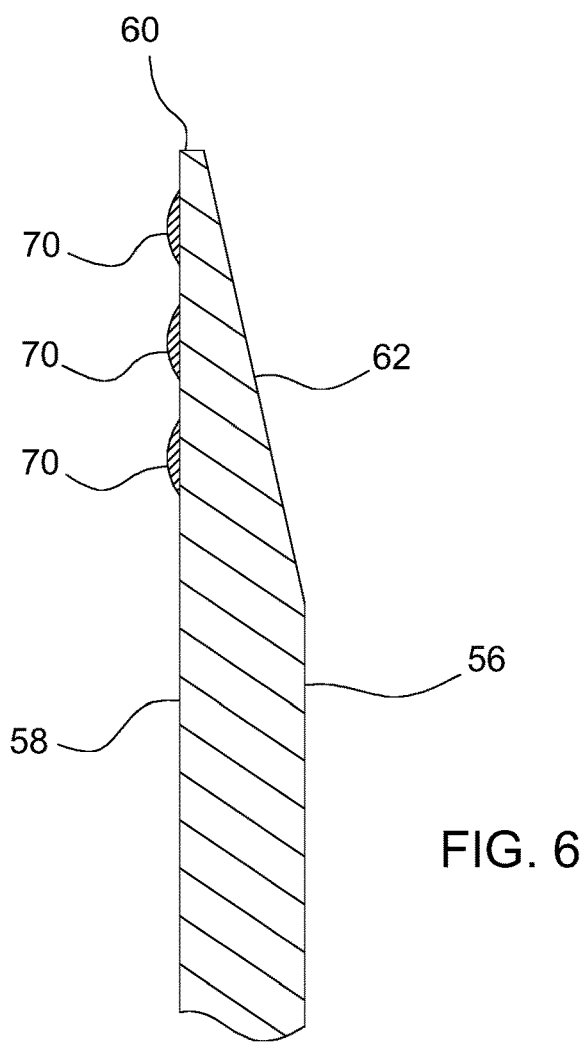
FIG. 6 is a sectional view of the disk blade of FIG. 5 as seen from the line 6-6 of FIG. 5 illustrating the beads of hardened material.

In one embodiment, one or more beads of hardened material are applied as continuous beads, circumferentially, near the outer edge 60. As shown in FIGS. 5 and 6, three beads 70 are concentrically arranged near the outer edge 60. Beads 70 are said to be straight beads as they are each a constant distance from the outer edge 60, or in other words, parallel to the outer edge 60. The beads may have a width of about 5 mm. The concentric beads may be spaced apart from one another or placed so as to touch one another. Alternatively to multiple concentric beads, a single bead, or band, of hardened material may be placed on the blade having a width ranging from less than 1.5 mm to greater than 30 mm.

Figure 7:
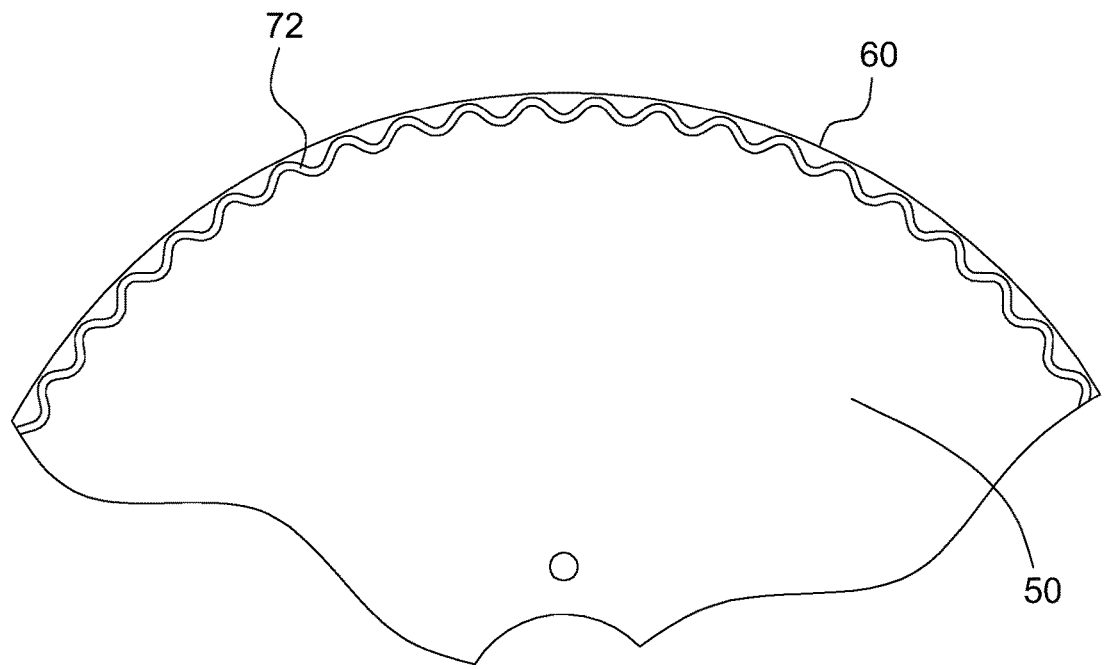
FIGS. 7-12 are fragmentary plan views of a bottom surface of the disk blade illustrating additional embodiments of the hardened material beads on the disk blade.
Figure 7A:
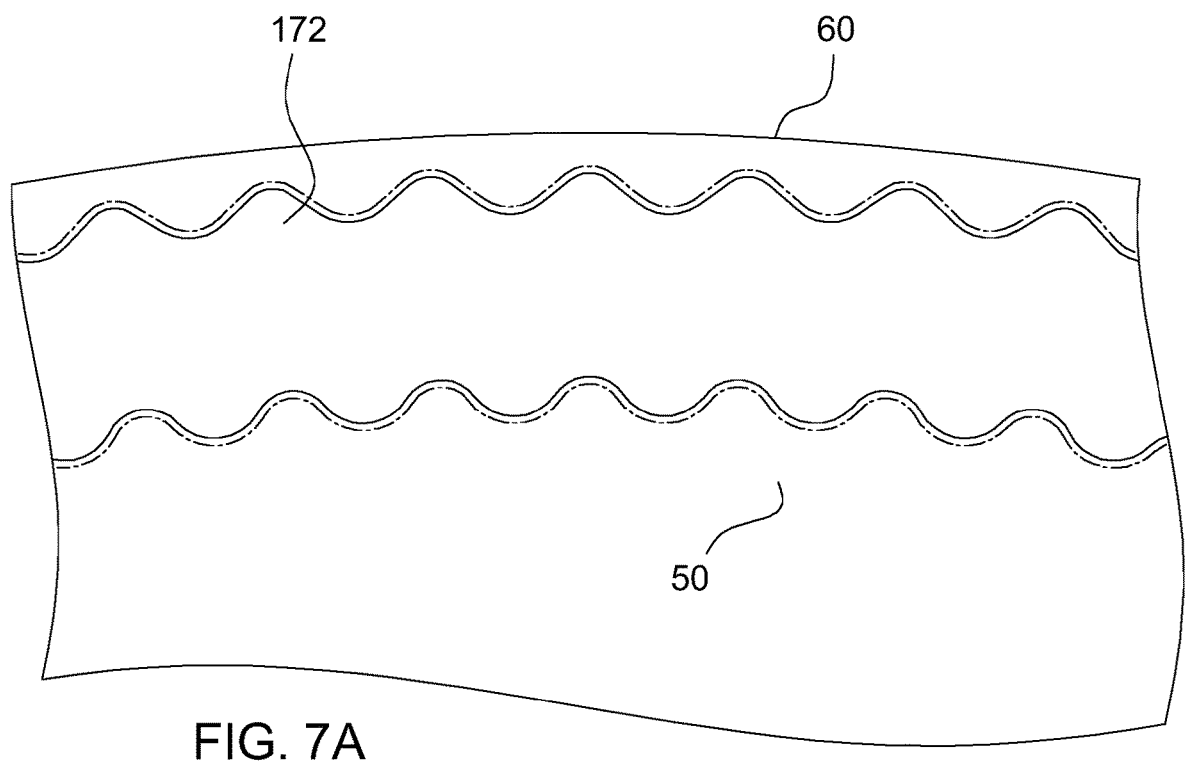

An alternative bead arrangement is shown in FIG. 7 where a continuous bead 72 is applied circumferentially near the outer edge 60. Instead of a straight pattern as with bead 70, bead 72 is a "wavy" bead, similar to the form of a sine wave having smooth repetitive oscillations of varying distance from the outer edge 60. This bead may have a width of 5 mm but could be smaller or larger. Again, a band having a width of 1.5 to 30 mm can be applied in a wavy pattern as well. For example, with reference to FIG. 7A, a wide bead 172 of cladding is applied in a wavy pattern. The wide bead can be anywhere between 1.5 and 30 mm in width or even larger if desired. As with the other "wavy" beads shown, this allows the edge to wear in a serrated manner.

Figure 8:
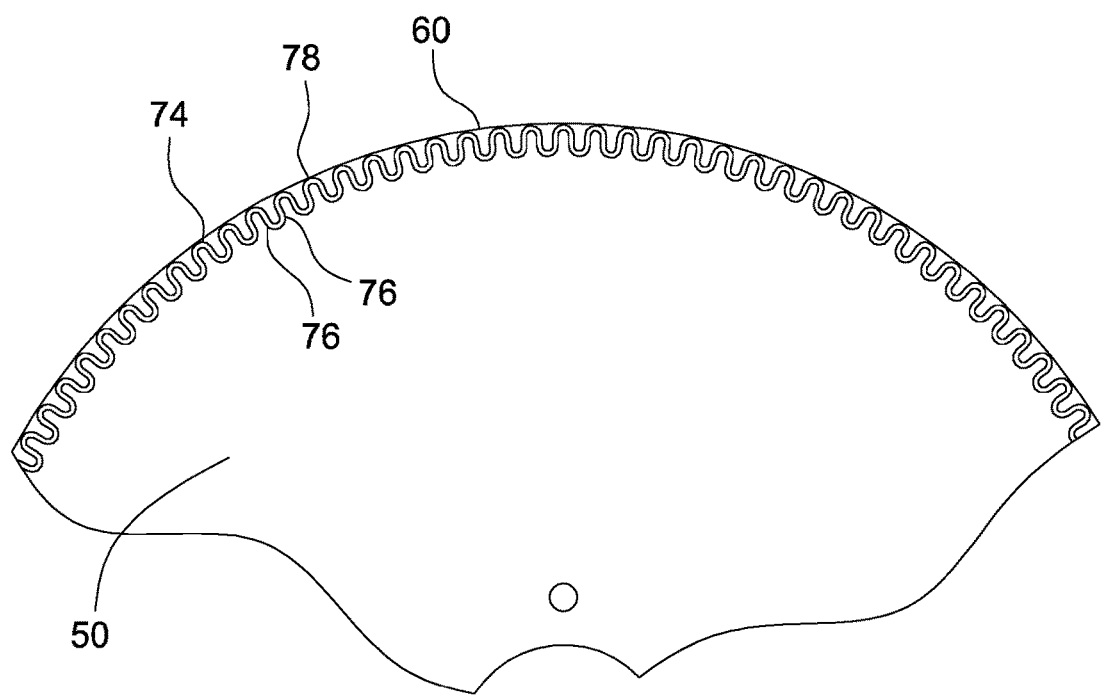
Figure 8A:
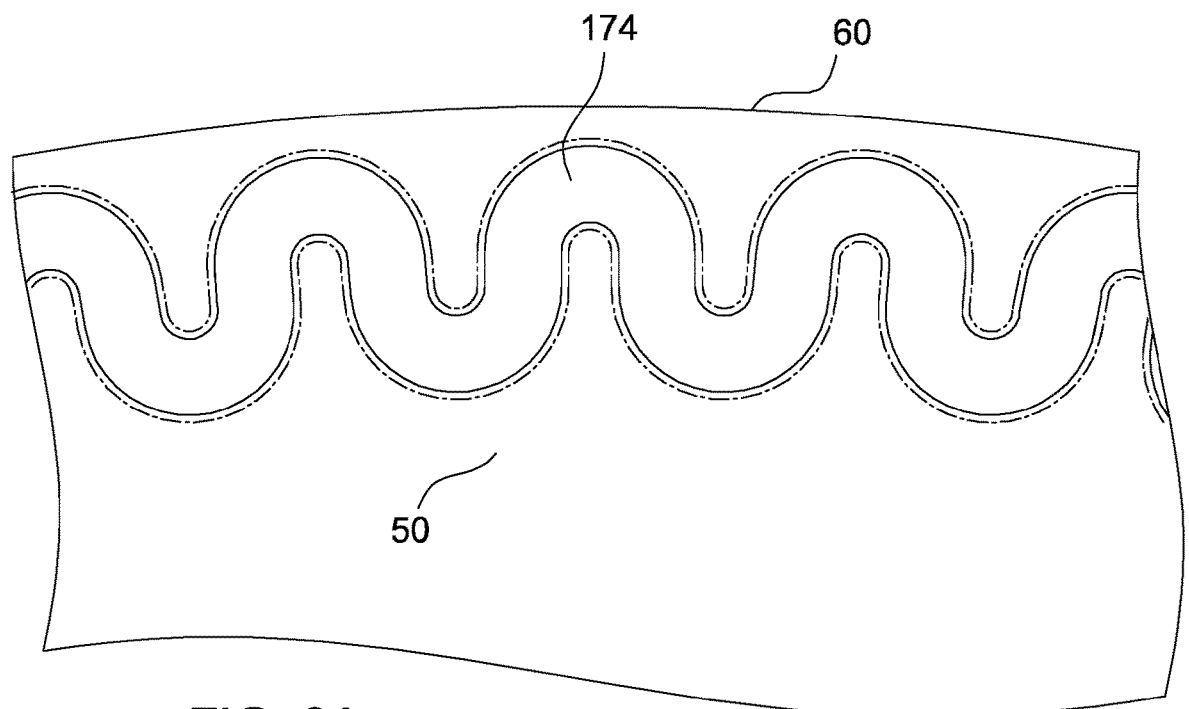

Another alternative wavy bead 74 is shown in FIG. 8 having a shorter "wavelength" compared to the bead 72 of FIG. 7. The "legs" 76 of the wave, between the apexes 78, are substantially radially extending relative to the central rotational axis of the disk blade 30. The bead 74 is shown having a thickness or width of approximately 5 mm. In FIG. 8A, a similar wavy bead 174 is shown but having a greater bead width, on the order of 8-10 mm resulting in a greater portion of the disk surface 50 being coated with the cladding material compared to the bead 74 of FIG. 8.

Figure 9:
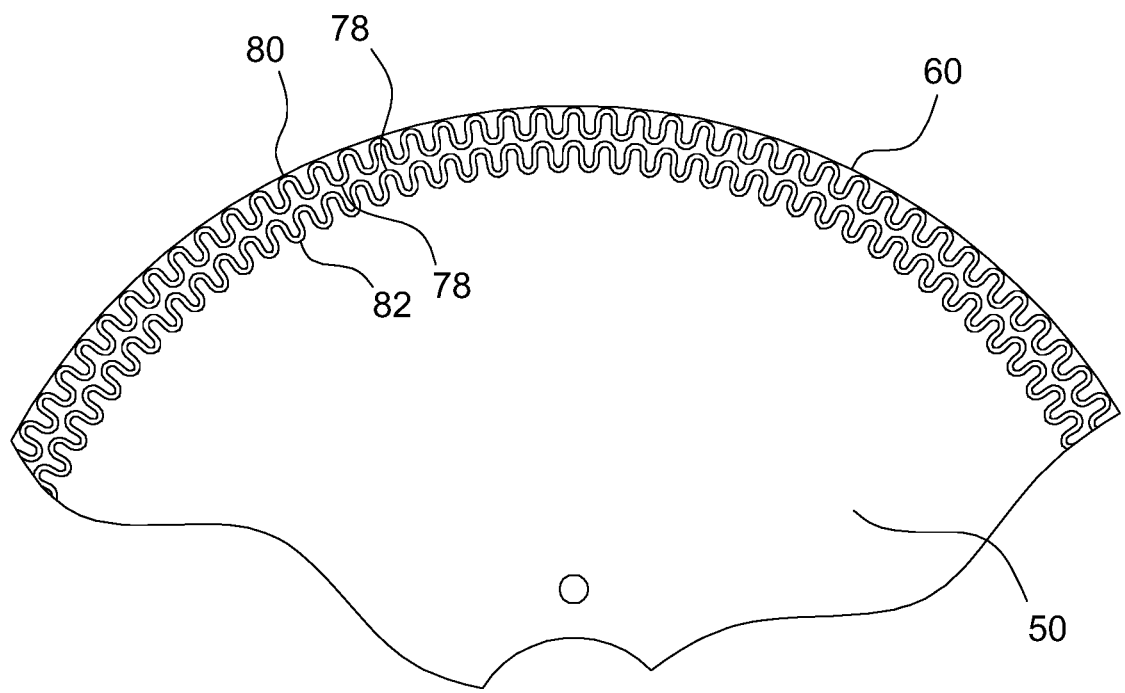

Multiple wavy beads 80 and 82 can be applied concentrically as shown in FIG. 9. With the wavy bead, the disk may wear in a serrated pattern between the outer apexes of the bead. This will may facilitate keeping the edge 60 sharp enough to cut through plant residue.

Figure 10:
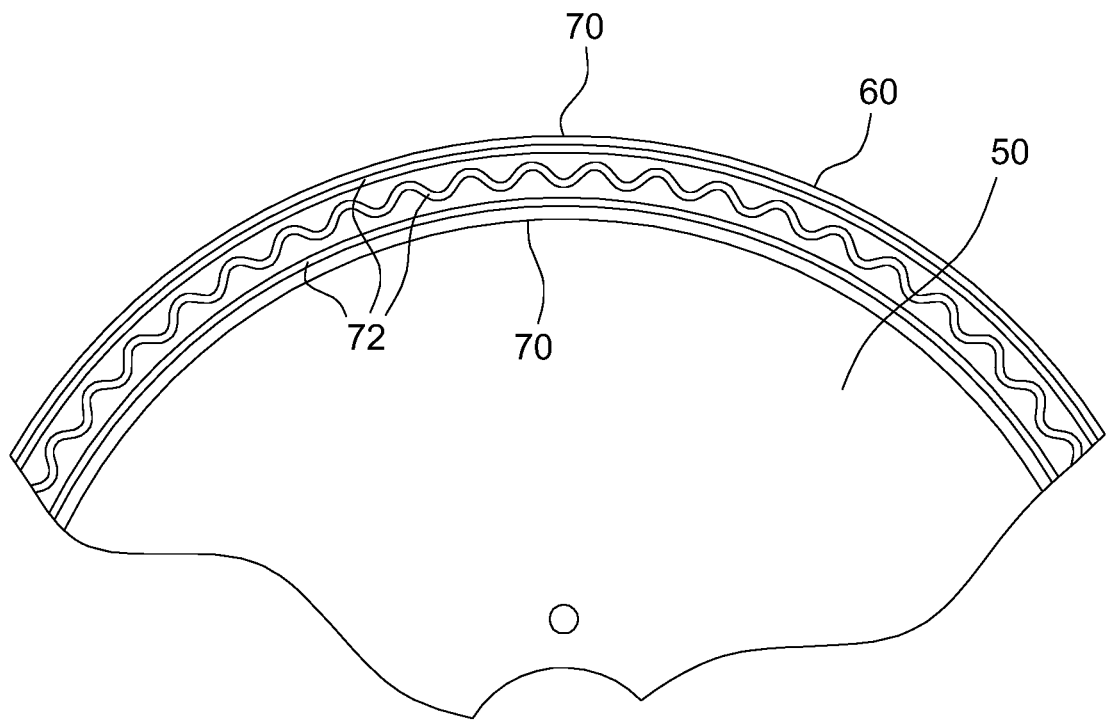

Both straight beads 70 and wavy beads 72 can applied together as shown in FIG. 10. Here, a wavy bead 72 is place concentrically between two straight beads 70. The apexes of the wavy bead are shown touching the straight beads, however, the beads can be spaced from one another.

Figure 11:
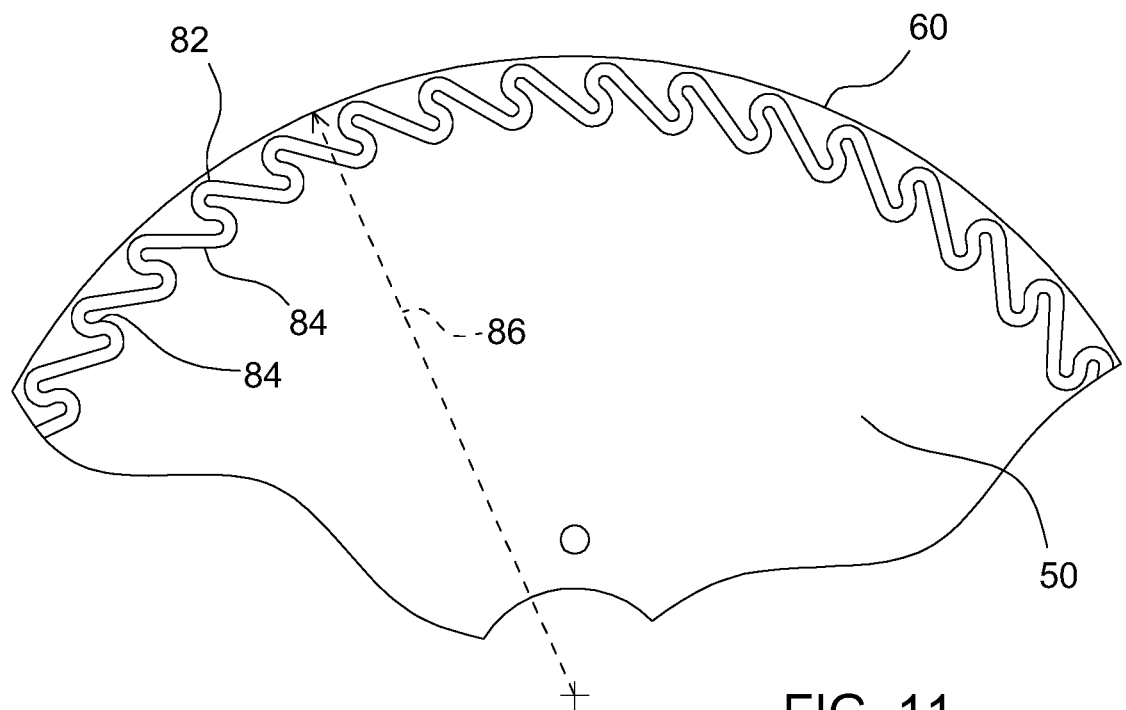

In a further embodiment shown in FIG. 11, the legs 84 of the wavy bead 82 are arranged at a substantial angle relative to a radial line 86. This produces a generally "saw-tooth" pattern for the bead 82.

Figure 12:
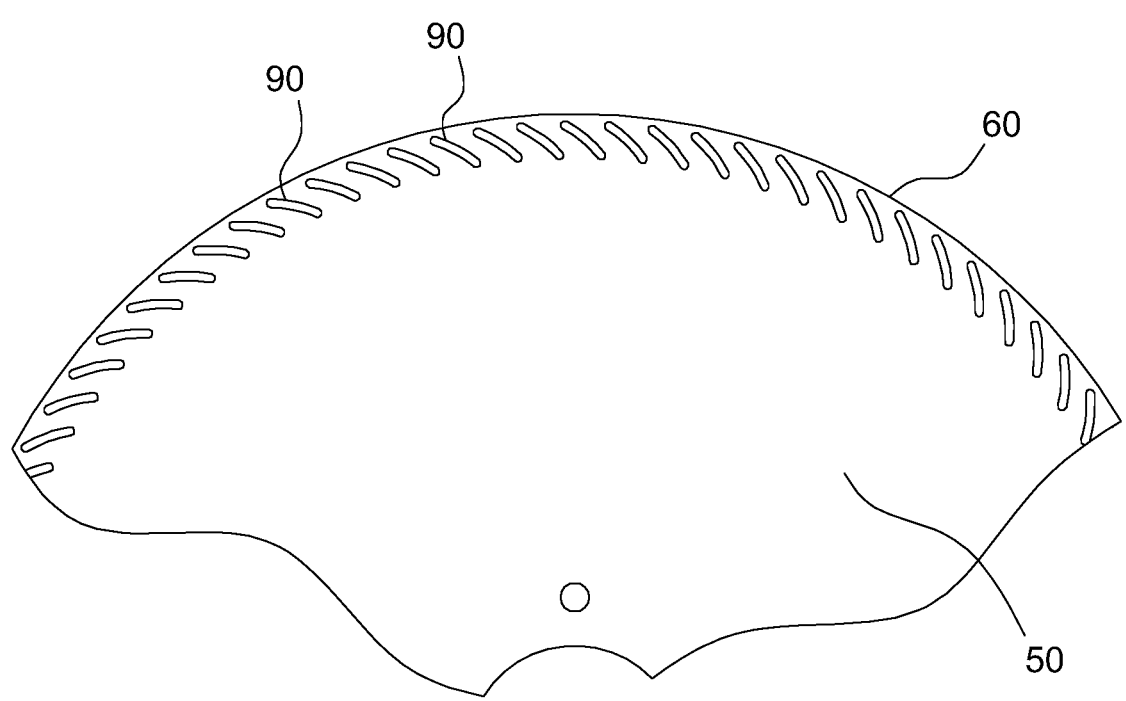

A further embodiment does not include a continuous bead about the periphery of the disk blade but rather has a plurality of short, curved beads extending inwardly from the outer edge 60. With reference to FIG. 12, beads 90 are shown which start near the outer edge and curve radial inwardly toward the center of the disk. At the outer edge, the beads are closer to being tangent to the outer edge, but the beads then curve inwardly, to a more radial direction near the bead inner ends. The beads are spaced apart so that as the base material wears between the beads, a serrated edge forms on the disk blade outer edge 60.

Figure 13:
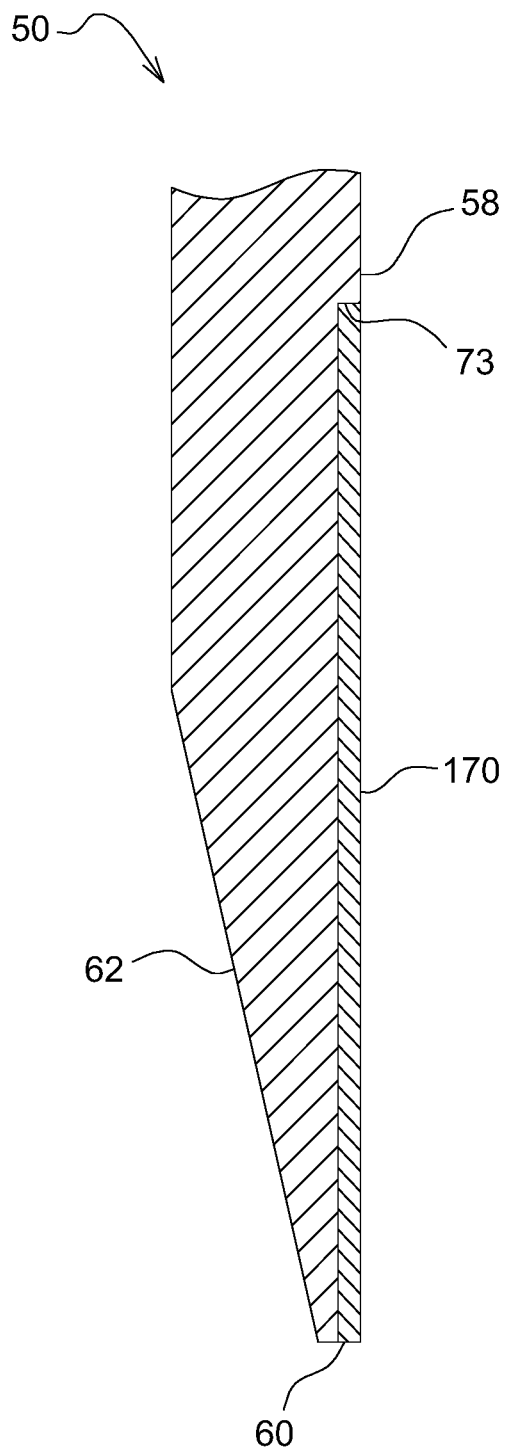
FIGS. 13 and 14 are sectional views of alternative constructions where the clad hardened material is inlaid in a recess in the blade base material.
Figure 14:
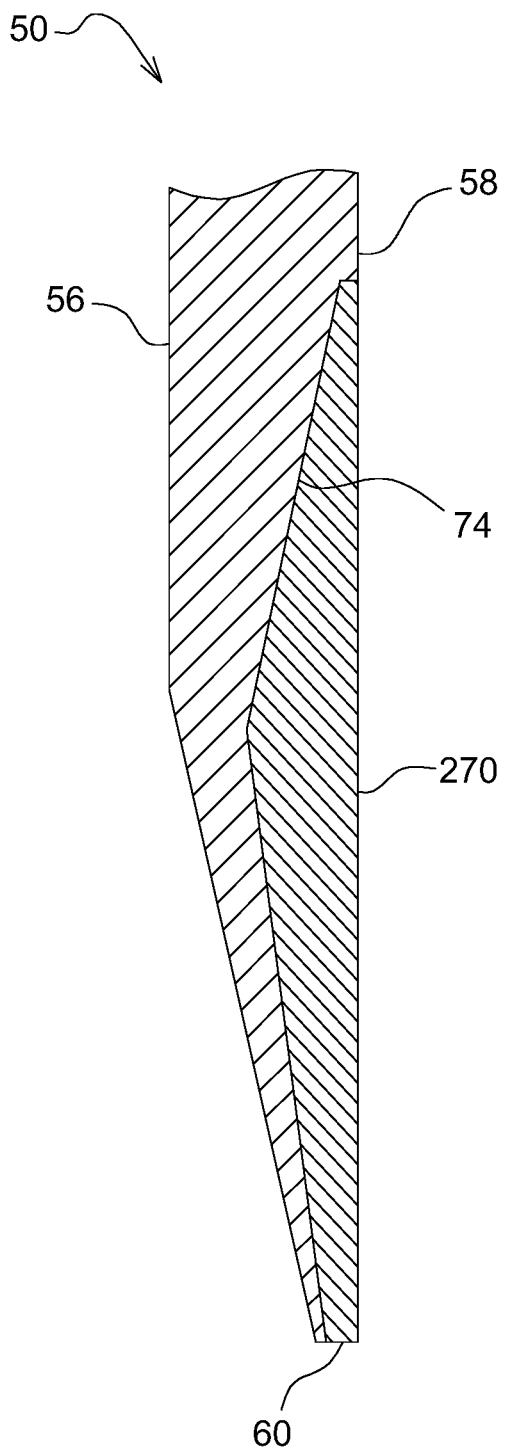
Figure 15:
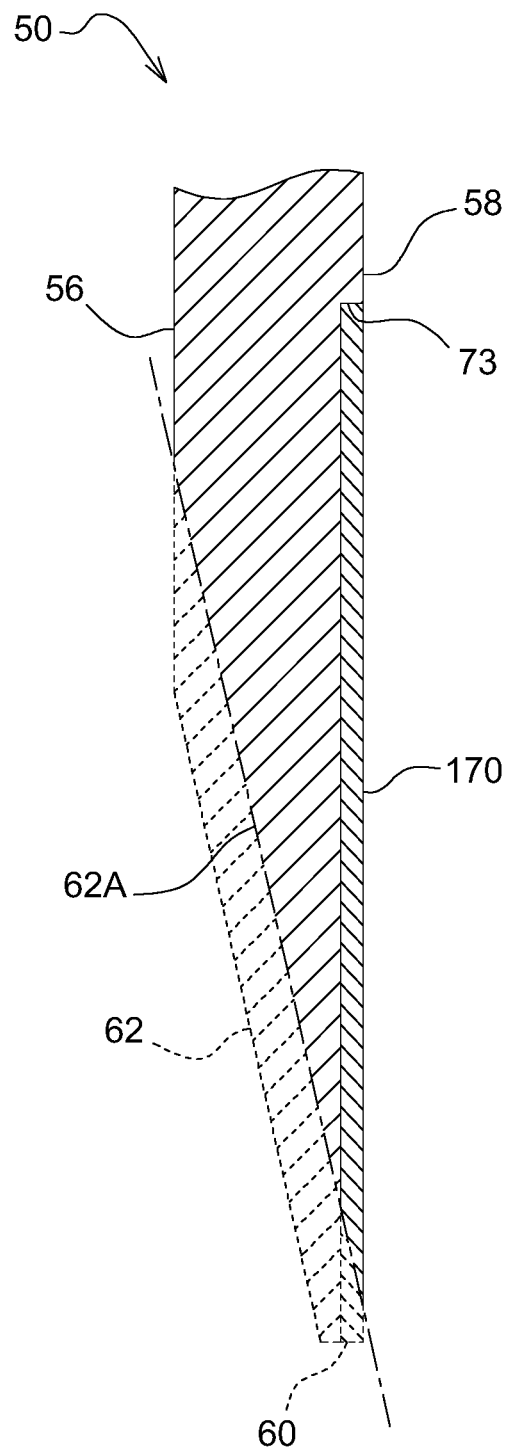
FIG. 15 is a sectional view similar to FIG. 13 illustrating a wear pattern of the disk blade.

An alternative embodiment is shown in FIG. 13 where the clad bead 170 is inlaid within a recess 72 in the bottom surface 58 of the blade body. This results in a substantially continuous bottom surface of the blade body. While the surface of the clad bead will not be as smooth as the surface of the blade body, the clad bead will not be projecting beyond the blade surface, where it could damage the gauge wheel 36 adjacent to or contacting the blade surface. FIG. 14 shows yet another alternative where the bead 270 is inlaid into a deeper recess or cut-out 74 in the bottom surface 58 of the blade base. This provides more wear resistant material at the outer edge of the blade. As shown in FIG. 15, the cladding 170 is applied to the flat side 58 of the disk as opposed to the beveled side 56. This allows the disk to wear in a manner that maintains a sharp edge. By altering the section profile of the cladding, the wear rate and sharpness of the disk can be controlled in order to maintain the optimal cutting edge on the disk. As the base material of the disk wears away on the bevel 62, the surface of the bevel wears radially inward as indicated by the line 62A. As it does so, the surface continues to maintain the bevel, resulting in a narrow edge that is sharp. In contrast, if the cladding is applied to the beveled surface, as the base material wears radially inward on the flat side, an increasingly thicker blunt edge will be produced.

Figure 3:
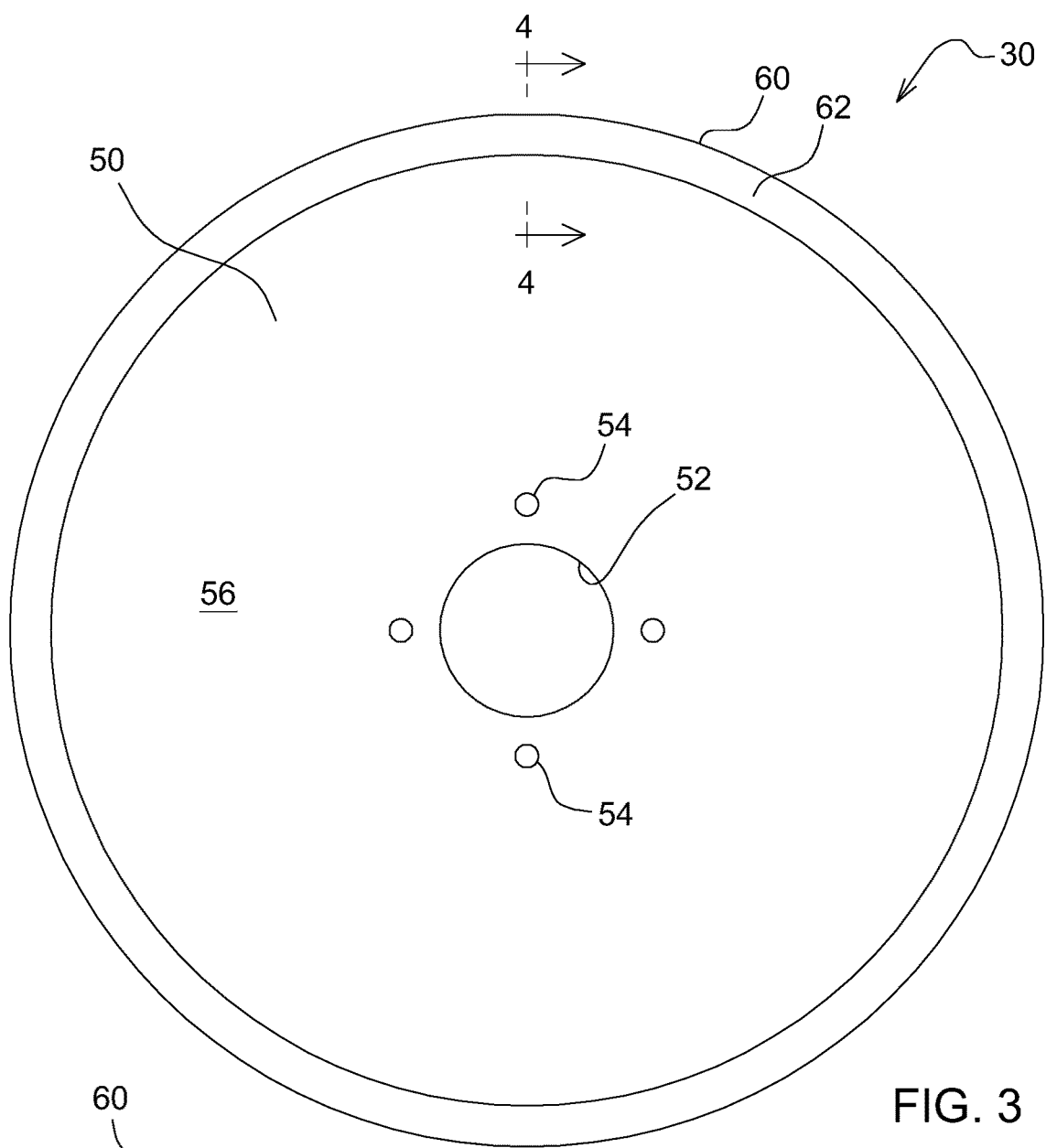
FIG. 3 is a plan view of a top surface of an opener disk blade of the opener assembly of FIG. 2.
Figure 4:
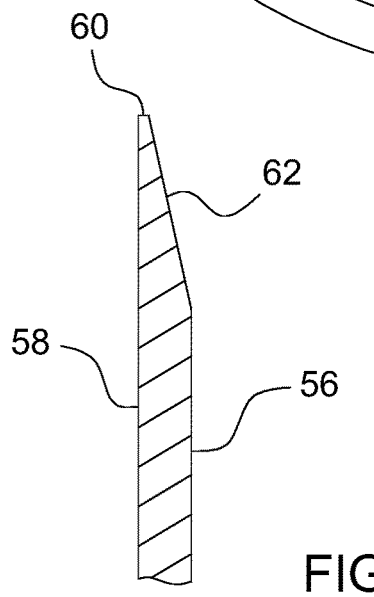
FIG. 4 is a sectional view of the disk blade of FIG. 3 as seen from the line 4-4 of FIG. 3.
Figure 16:
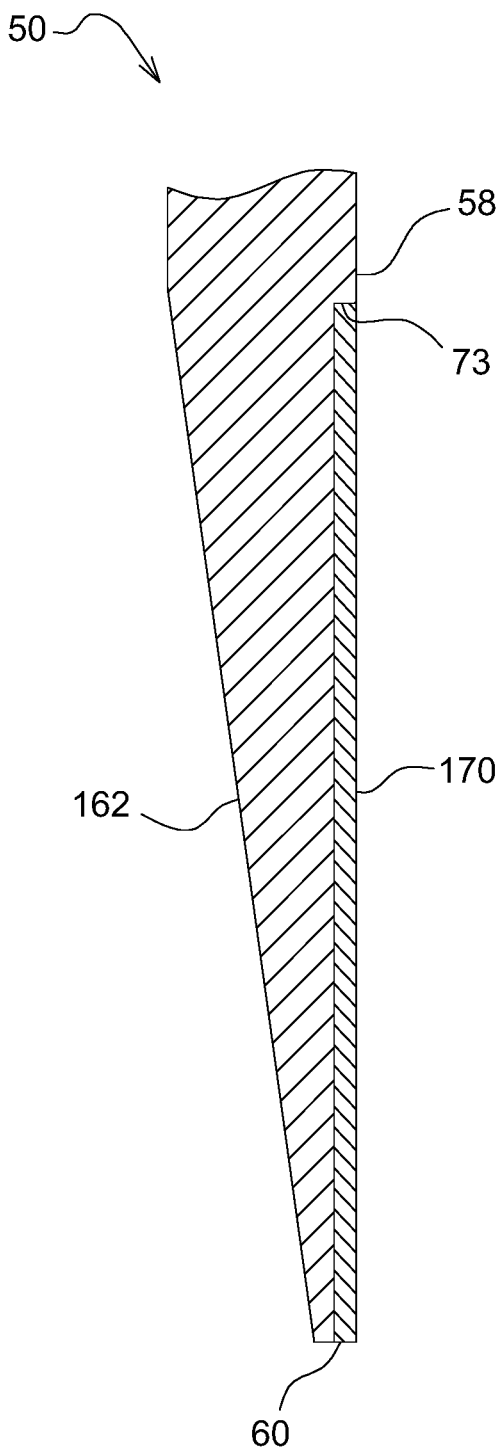
FIG. 16 is a sectional view of yet another embodiment where the bevel extends radially inward approximately the same extent as the clad bead.
Figure 17:
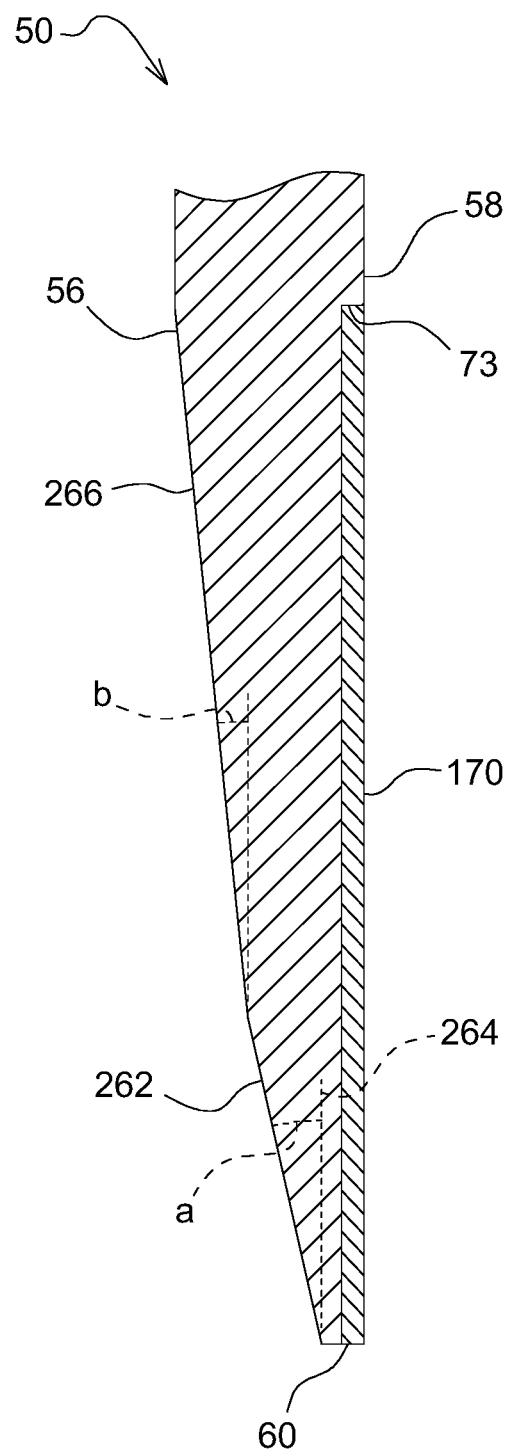
FIG. 17 is a sectional view of another alternative where the bevel has two bevel portions having different bevel angles.
Figure 18:
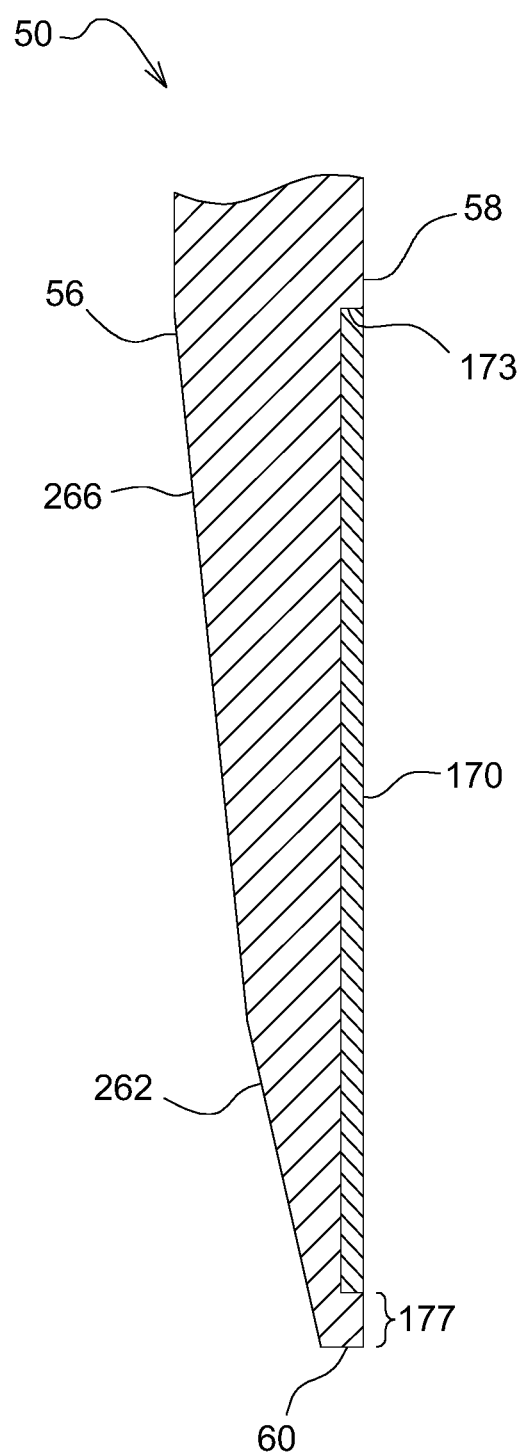
FIG. 18 is a sectional view of another alternative construction where the clad hardened material is inlaid in a recess in the blade base material.

The cladding reduces the rate of blade wear, thus increasing the disk life. The life of the disk can be further increased by maintaining a sharp edge. A typical disk may have a diameter of 18 inches and the equipment manufacturer may recommend replacing the disk when it wears to a diameter of 16 inches. However, many farmers replace the disks at 17 or 16.5 inches primarily due to lack of edge sharpness. If the disk edge can be maintained sharp, the disk blade life may be further extended by remaining in service until it reaches a 16 inch diameter. As noted above, the edge sharpness is maintained by cladding the wear resistant material onto the flat surface of the disk, allowing the base material of beveled edge to wear. The sharper edge may be maintained to a diameter of 16 inches by increasing the radial extend of the beveled surface 162 as shown in FIG. 16. There, the beveled edge 162 extends radially inward to approximately the radial inner edge of the cladding 170. The cladding and bevel may extend inwardly between 20 mm and 40 mm from the edge 60. This may allow the disk to wear to a diameter of about 16 inches or less before the beveled edge and cladding is worn off. An alternative extended bevel is shown in FIG. 17. To avoid that the outer portion of the disk is too thin, an outer bevel portion 262 has a first bevel angle "a." The bevel angle being the angle of the surface of the bevel 262 relative to a line 264 parallel to the blade body surface 56. A radially inner bevel portion 266 has a bevel angle "b" lesser than the angle "a," such that the total radial extent of the bevel extends inwardly approximately as far as the cladding 170. This bevel configuration produces a thicker base material portion at the edge like the bevel 62 in FIG. 3, compared to the bevel of FIG. 16.

By cladding the harder material as beads, the amount of added material is minimized compared to complete coating of the disk near the outer edge. This reduces the extent of heating of the blade body during application, minimizing distortion of the blade body. The bead application by cladding can be detrimental to previous heat treating of the blade base material. As a result, it may be desired to perform heating treating of the blade base material after the cladding process.

While the wear resistant beads are shown on a flat disk of a disk opener, they can also be formed on other ground engaging components such as planters and tillage disk blades, whether flat or concave blades. These blades can have varying diameters with different wear rates and characteristics. In addition, the beads can be added to various disk coulters, either flat coulters or wave coulters or on the outer edge portions of a cutout coulter.

The terms "top" and "bottom" used in the description of the blade 50 is intended solely to distinguish one side surface from the other and is not intended to limit the blade to any specific orientation.

What is claimed is:

1. A disk blade comprising:
   a circular blade body configured to penetrate into and move through soil, the circular blade body being of a first base material having a first hardness and having a top surface and a bottom surface and an outer edge extending around a periphery of the circular blade body; and
   at least one raised clad bead extending circumferentially about the blade body on the bottom surface adjacent the outer edge, the raised clad bead having a second hardness greater than the first hardness and being configured to cause selective wear of the first base material of the circular blade body.

2. The disk blade of claim 1, wherein the at least one raised clad bead comprises a straight circular bead extending about the circular blade body at a constant distance from the outer edge.

3. The disk blade of claim 2, wherein the at least one raised clad bead further comprises a plurality of straight circular clad beads concentrically arranged relative to one another.

4. The disk blade of claim 3, wherein the plurality of straight circular clad beads are adjacent one another without any exposed base material between adjacent straight circular clad beads.

5. The disk blade of claim 3, wherein the plurality of straight circular clad beads are radially spaced from one another with exposed base material between adjacent straight circular clad beads.

6. The disk blade of claim 1, wherein the at least one raised clad bead comprises a wave bead having smooth repetitive oscillations of varying distance from the outer edge.

7. The disk blade of claim 6, wherein the at least one raised clad bead further comprises a plurality of wave beads concentrically arranged relative to one another.

8. The disk blade of claim 6, wherein one or more raised clad beads of the at least one raised clad bead has a width of between 1.5 mm and 10 mm.

9. The disk blade of claim 6, wherein one or more raised clad beads of the at least one raised clad bead has a width of between 10 mm and 40 mm.

10. The disk blade of claim 9, wherein the top surface of the circular blade body comprises a beveled portion extending radially inward from the outer edge a distance approximately equal to the width of one or more raised clad beads of the at least one raised clad bead.

11. The disk blade of claim 1, wherein the at least one raised clad bead comprises one straight circular bead and one wave bead.

12. The disk blade of claim 6, wherein the wave bead has leg portions extending between inner apexes and outer apexes of the wave bead and wherein the leg portions extend substantially radially.

13. A disk blade comprising:
    a circular blade body configured to penetrate into and move through soil, the circular blade body being of a first base material having a first hardness and having opposite top and bottom surfaces and an outer edge extending around a periphery of the circular blade body, the bottom surface of the circular blade body having a recessed ring portion adjacent the outer edge; and a wear resistant second material substantially filling the recessed ring portion to form a substantially continuous bottom surface of the blade body, the wear resistant second material having a second hardness greater than the first hardness, wherein the top surface of the circular blade body comprises a beveled portion extending radially inward from the outer edge of the top surface of the circular blade body, wherein a radial width of the beveled portion is approximately equal to a radial width of the recessed ring portion, and wherein the beveled portion comprises a radially outer beveled portion having a first bevel angle and a radially inner beveled portion having a second bevel angle.

14. A disk blade comprising:

a circular blade body configured to penetrate into and move through soil, the circular blade body being of a first base material having a first hardness and having a top surface and a bottom surface and an outer edge extending around the circular blade body; and a plurality of clad beads extending radially inwardly from the outer edge of the circular blade body, the plurality of clad beads having a second hardness greater than the first hardness, wherein each clad bead of the plurality of clad beads is curved so as to be more tangential to the outer edge of the circular blade body at an outer end of the clad bead and curved to be more radial to the circular blade body at an inner end of the clad bead.

15. A disk blade comprising:

a circular blade body configured to penetrate into and move through soil, the circular blade body being of a first base material having a first hardness and having opposite top and bottom surfaces and an outer edge extending around a periphery of the circular blade body, the bottom surface of the circular blade body having a recessed ring portion adjacent the outer edge; and a wear resistant second material substantially filling the recessed ring portion to form a substantially continuous bottom surface of the blade body, the wear resistant second material having a second hardness greater than the first hardness, wherein the recessed ring portion extends radially outward to an outermost point on the outer edge.

* * * * *